April 10, 1934.  H. W. ZIMMERMAN  1,954,233
GAUGE FOR TESTING CYLINDRICAL OBJECTS
Filed July 3, 1930  2 Sheets-Sheet 1
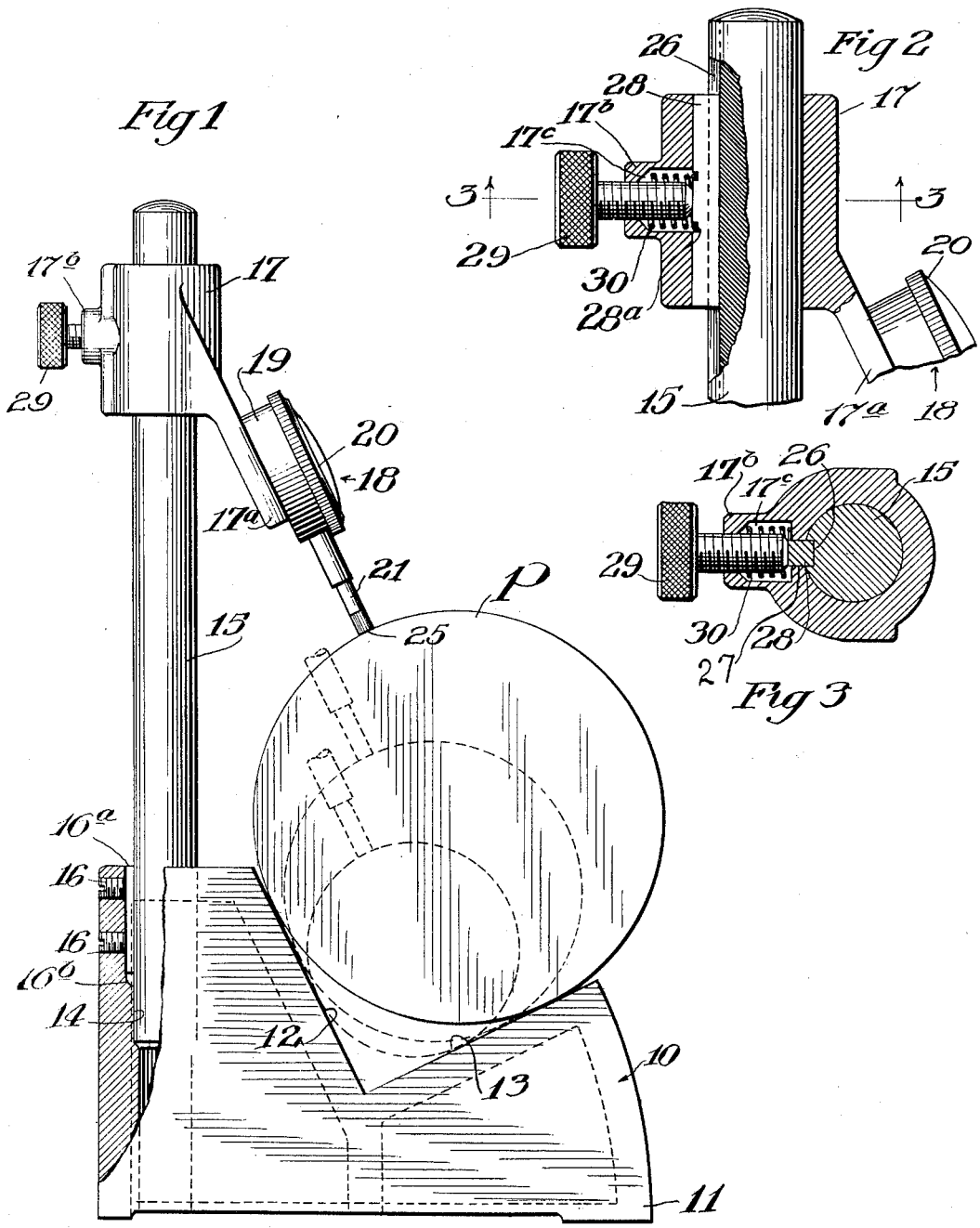

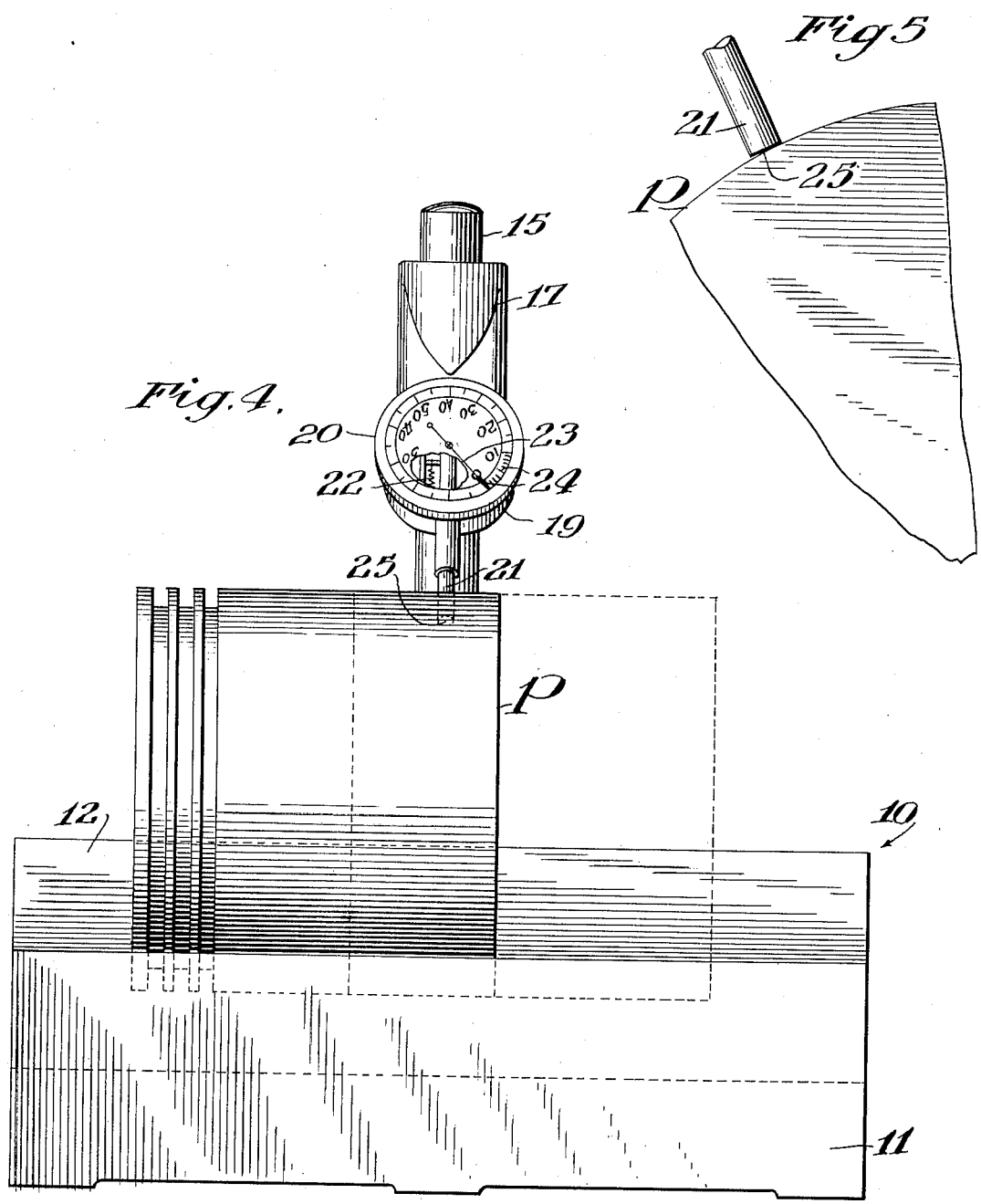

Patented Apr. 10, 1934

1,954,233

UNITED STATES PATENT OFFICE 1,954,233

GAUGE FOR TESTING CYLINDRICAL OBJECTS

Herman W. Zimmerman, Chicago, Ill., assignor to Automotive Maintenance Machinery Co., Chicago, Ill., a corporation of Illinois Application July 3, 1930, Serial No. 465,530

2 Claims. (Cl. 33—147)

My invention relates generally to gauges and has to do particularly with gauges of a character adapted for testing cylindrical objects for out-of-roundness and other shape and surface deformation, and which is also well adapted for determining and comparing sizes of objects.

My invention has utility, particularly, in the gauging and truing-up of pistons and, to facilitate explanation of my invention, I will refer to the same in its adaptability to this use. However, it is to be understood that my invention has utility in the gauging, sizing, truing-up, etc., of any cylindrical object where the results obtained by my invention are sought.

One of the objects of my invention is to provide a tool of the foregoing character which is of simple construction and cheap to manufacture and which is accurate in measurement and quickly and easily operated even in the hands of unskilled operators.

In accordance with my invention, the gauging tool which I provide is adapted to not only serve for gauging purposes, but is also adapted to support the piston while the same is being trued-up following the gauging operation, and another object of my invention is to provide such a tool which is strong and sufficiently durable to withstand anvil-like use with a minimum of wear and without injury to its gauging surfaces.

Another object is to provide such a tool which is adapted to supportingly maintain the piston in a predetermined position relative to the gauging means as the piston is adjusted circumferentially or longitudinally from one position to another, whereby the character and extent of out-of-round, or deformation, or taper, or the size of the piston being gauged can be accurately determined.

A further object is to provide a gauge tool which includes a pair of jaws disposed at right angles to each other and of sufficient size to support pistons, or similar objects, of various diameters; and to provide in conjunction therewith a gauging device adjustable to always engage the wall of the object at a point from which a line projected through the center of the object will pass through the opposed jaw at right angles to the latter, and the other jaw engaging the wall of the object at a point from which a line projected at right angles to such latter jaw will pass through the center of the object, intersecting the first-mentioned line at right angles.

An additional, and more specific, object is to provide a tool of the foregoing character in which one of the jaws carries a standard with its axis disposed substantially at 26°—34+′ with respect to its supporting jaw, which standard carries a gauging-device projecting therefrom in a direction parallel with the standard-supporting jaw and also projecting in a direction at right angles to the other jaw; whereby the portion of said gauging device which contacts with the object always moves in adjustment in a vertical plane parallel with the axis of the standard.

Another object is to provide a gauging unit for a tool of this character which includes a yieldable member having an end part engageable with the wall of the object which end part is so shaped as to compensate for lateral displacement of said member as it yields in engagement with the object to maintain the aforementioned relationship between the gauge device, the jaws and the center of the object.

Other objects are to provide a novel form of self-holding adjustable support for the gauging-device which avoids accidental dropping and injury to such device during and between adjustments; to provide means for maintaining a predetermined relationship between the jaws, piston center, and gauging device irrespective of out-of-roundness or other deformation of the piston, or similar object; and to provide a tool of this character useful in servicing as well as production work.

Other objects and advantages will become apparent as this description progresses and by reference to the drawings wherein,—

Figure 1 is a side view, partially in section, of one form of tool embodying my invention, and showing the same in its application to pistons of various diameters;

Fig. 2 is an enlarged parti-sectional view showing my improved form of support for the gauging-indicator.

Fig. 3 is a section taken substantially on line 3—3 of Fig. 2;

Fig. 4 is a front view of the structure shown in Fig. 1, and illustrating the adaptation of the tool to longitudinal gauging of the piston; and Fig. 5 is an enlarged fragmentary view illustrating the gauge device compensating feature of my invention, whereby the proper gauging relationship between the several parts is maintained notwithstanding variation in piston diameters, out-of-roundness, or other deformation.

Referring particularly to the form of tool which I have chosen to illustrate my invention, I employ an anvil-like block 10 which is, preferably, formed of a single casting properly finished to provide a base portion 11 and jaw surfaces 12 and 13 disposed at right angles to each other and upon which the piston is adapted to rest. The size of the block 10 may, obviously, vary to accommodate a greater range of piston diameters but, in each instance, the jaw-relationship should be as illustrated. The rear wall of the block is provided with a socket 14 adapted to receive an upright, preferably circular, standard 15 which is fixedly held in the socket by set screws 16 having their ends engaging a key 16ª in a keyway 16ᵇ.

The length of the standard 15 may vary as desired and is adapted to support a gauging unit which includes a sleeve 17 having an arm 17ª carrying what I term a gauge device 18. This gauge device includes a cylindrical body part 19 supporting rotatably thereon the cylindrical dial member 20. The lower end of the body 19 reciprocably receives a stem member 21, the inward reciprocating movement of which is opposed by a spring 22. The portion of this stem located within the cylindrical body 19 may operate any well-known, conventional form of mechanism for rotating the indicator hand 23 in one direction as the stem 21 is moved inwardly and in the other direction as the stem is moved outwardly. The dial marking is such (as is customary in devices of this character) that movement of the dial hand 23 a distance equal to the distance between the dial marks 24 represents a .001" displacement of the stem 21. The outer end of the stem 21 is, preferably, flattened as at 25 for a purpose which will become obvious hereinafter.

The gauge device 18 is rather sensitive and should be handled carefully at all times and, to prevent accidental movement of the same which might result in material injury, I provide what I believe to be a novel form of mounting for devices of this character. Specifically, the side of the standard 15 opposite the jaw 12 is provided with a groove or keyway 26 which aligns with a similar keyway 27 in the sleeve 17. These two keyways receive a key 28 which prevents relative rotation between the standard and sleeve but permits of relative sliding movement. The rearward portion of sleeve 17 is provided with a chambered boss 17ᵇ having a screw threaded opening which adjustably receives the locking screw 29. When the sleeve has been adjusted to the desired position along the standard 15 the screw 29 is adjusted inwardly until its inner end engages the key 28 clamping it in the standard groove, preventing movement of the sleeve until the screw is loosened.

For convenience of the operator, it may be desirable at times, as between adjustments, to permit the screw 29 to remain loosened and equally desirable to prevent the sleeve from sliding freely along the standard which might injure the gauge device 18. To provide for this feature, the key 28 is provided with spaced notches 28ª which receive the end coil of a spring 30 mounted in the boss chamber 17ᶜ. This spring, being confined under compression between the boss end-wall and the key 28, frictionally engages the key 28 with the wall of keyway 26 with sufficient force to hold the sleeve 17 in any position to which it is moved, but such sleeve may be freely slid to any position by the application of slight force.

The relative positions of the parts hereinbefore described are of importance with respect to my invention, to the end that the piston, or other object, whether true-round, out-of-round, etc., may be accurately gauged. More particularly, the finished jaw supporting surfaces 12, 13 are disposed at right angles presenting a V-shaped support for the piston P. The axis of standard 15 is so related to the plane of the jaw face 12 that such plane projected will intersect the standard 15 at an angle of 26°—34+'. The axis of gauge stem 21 is parallel with the jaw face 12 and projected in one direction will intersect the standard axis at an angle of 26°—34+' and projected in the opposite direction will pass through the jaw face 13 at right angles thereto. Normally, the parts are so arranged and related that a line intersecting the apex of the angle between the jaw faces 12 and 13 and extending parallel with the standard 15 intersects the end portion of the stem 21 at the point where it is contacting with the piston, and such line also intersects at an angle of 26°—34+' a line projected from such point of contact through the jaw face 13 at right angles to the latter (see Fig. 1). The foregoing may be termed the "normal position" of the parts.

With the foregoing relationship of the parts, when a piston of a diameter within the range suited for the tool is seated upon the jaw faces 12 and 13, it contacts with such faces at two points spaced 90 degrees apart and lines projected from such points of contact at right angles to the jaw faces 12 and 13 intersect at the center of the piston P at right angles to each other. When the sleeve 17 is adjusted so as to bring the end of the stem 21 down into contact with the piston such end of the stem contacts the piston at a point from which a line projected through the center of the piston passes through the jaw face 13 at right angles thereto; and, under such conditions, a line projected from the point of contact between the jaw face 12 and the piston at right angles to such jaw face passes through the center of the piston at right angles to the above-mentioned line. This relationship always exists (irrespective of the size) within the diameter limits of the tool as clearly illustrated in dotted lines in Fig. 1.

It will be appreciated that an out-of-round piston may be placed upon the jaws in such a position that its out-of-round condition will displace its center farther away from the jaw face 12 (for example) than from the jaw face 13. To compensate for such condition, and so that the stem 21 will always (within the limits of any particular size tool) contact the piston at a point from which a line projected through the center of the piston will pass through the face 13 at right angles, the stem end is flattened at right angles to its axis in which case the stem may contact the piston beyond the stem axis as illustrated (for example) in Fig. 5. In such an oval, out-of-round piston, as the piston is rotated upon the jaw faces 12, 13, the point of contact as between the stem 21 and piston will change but there will always be the above-described on-center contact relationship insuring a positive, accurate measurement of the extent and character of the out-of-roundness by observing the dial hand 23 as will be explained more fully hereinafter.

In the sizing of pistons (selecting a plurality of pistons of substantially the same diameter), I may use any ordinary gauge ring (not shown) of the desired size or diameter. I first insert the ring upon the jaw faces 12, 13 to the position indicated by the piston P in Fig. 1, and then set the sleeve 17 to the desired position to contact the stem 21 with the ring, whereupon the gauge ring is removed. The tool is then ready to serve as a gauge for selecting any desired number of pistons, all being of the same, or substantially the same, diameter. The variation in sizes, if any, is accurately indicated by the dial hand 23 as above described.

In comparing pistons, the tool may be adjusted to one certain piston and the other pistons then gauged one after the other to determine whether or not they are the same or different sizes, and to determine the variation in sizes as just described.

It will be appreciated that in gauging out-of-round pistons, or even in gauging or comparing sizes of pistons, inward or depression movement of the stem 21 from the position it normally assumes results in lateral displacement of the point of contact of such stem with respect to the jaw face 12 and the standard 15, tending, unless compensated for, to throw it out of the hereinabove explained normal position with respect to the jaw faces 12, 13 and the piston center.

However, within the measuring limits of any particular size tool, the point of contact of the stem 21 with the piston, due to its flat end, remains in the normal position hereinabove described, even when the extent of displacement may be such as to bring the point of contact as illustrated in Fig. 5. In certain uses to which my invention may be put, lateral displacement of the point of contact, or other conditions which might tend to disturb the desired relationship, are so slight that the end of the stem may be comparatively small. In other cases, dependent upon the controlling circumstances, this end part may be enlarged.

The operation of the tool shown in the drawings will be readily understood from the foregoing. Preferably, in the use of the tool, for accurate gauging and measuring, even by an unskilled operator, when the piston, or other object, is placed upon the jaw surfaces 12 and 13, the sleeve 17 is moved downwardly until the end of stem 21 contacts with the piston and it is then moved slightly further downward until the stem 21 is placed under slight compression. The dial head 20 is then rotated in the desired direction so that the zero mark coincides with the pointer end of the dial hand 23. With this setting, when an out-of-round spot is contacted by the end of the stem 21, there will be movement either inward or outward of the stem (dependent upon the position of the out-of-round portion with respect to the jaw faces 12 and 13) moving the hand 23 either clockwise or counterclockwise, as the case may be, the extent of the movement (as shown by marks 24) indicating the extent of out-of-round. When an out-of-round condition is discovered, the piston may be moved sidewise from beneath the stem 21 (still supported by the jaw faces 12, 13) and a proper tool used to correct the out-of-round condition, when the piston will again be slid beneath the stem 21 and further gauged by rotating the piston in the same predetermined position upon the jaw faces 12 and 13. This operation may be repeated until the piston is true-round. The same operation may be carried out to test and correct longitudinal deformation of the piston wall as illustrated in Fig. 4. The foregoing operation, so far as gauging is concerned may be carried out in the selecting, sizing or comparing of pistons.

It will be understood that while I have shown only one form of my invention, other changes in details and arrangement of parts may be made without departing from the spirit and scope of my invention as defined by the claims which follow.

I claim:

1. In a device of the character described, means for supporting the object to be gauged, a standard carried thereby and having a keyway, a gauging instrument, a sleeve having keyway aligned with said first keyway and slidably carried by said standard and supporting said instrument, a key in said keyways, a spring carried by said sleeve and normally under compression engaging said key, and a lock screw carried by said sleeve and adapted to engage said key.

2. In a device of the character described, means for supporting the object to be gauged, a standard carried thereby and having a keyway, a gauging instrument, a sleeve having a keyway aligned with said first keyway and slidably carried by said standard and supporting said instrument, a key in said keyways and having spaced notches therein, a spring carried by said sleeve and normally under compression with one of its coils engaging the notches of said key, and a lock screw carried by said sleeve and adapted to engage said key to clamp the latter against said standard.

HERMAN W. ZIMMERMAN.